(12) United States Patent
Miyata (10) Patent No.: US 7,836,162 B2
(45) Date of Patent: Nov. 16, 2010

(54) TRANSACTION PROCESSING SYSTEM AND TRANSACTION PROCESSING METHOD

(75) Inventor: Tsuyoshi Miyata, Tokyo (JP)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 11/752,773

(22) Filed: May 23, 2007

(65) Prior Publication Data

US 2007/0276842 A1 Nov. 29, 2007

(30) Foreign Application Priority Data

May 23, 2006 (JP) ............... 2006-142340

(51) Int. Cl.
G06F 17/13 (2006.01)
(52) U.S. Cl. .................................... 709/223
(58) Field of Classification Search .................. 709/223
See application file for complete search history.

(56) References Cited

U.S. PATENT DOCUMENTS

| | | | |
|---|---|---|---|
| 5,457,791 A * | 10/1995 | Matsumoto et al. ............ 714/5 |
| 5,600,596 A * | 2/1997 | Shirakihara ............ 365/189.16 |
| 6,101,422 A * | 8/2000 | Furlong ........................ 700/96 |
| 6,466,949 B2 * | 10/2002 | Yang et al. ................... 707/201 |
| 2003/0101111 A1 * | 5/2003 | Dang et al. ..................... 705/31 |
| 2003/0204597 A1 * | 10/2003 | Arakawa et al. ............ 709/226 |
| 2004/0107237 A1 * | 6/2004 | Kashiwada .................. 709/200 |
| 2005/0025468 A1 * | 2/2005 | Osaki ........................... 386/125 |
| 2005/0105549 A1 * | 5/2005 | Ishida et al. ................. 370/463 |
| 2006/0129772 A1 * | 6/2006 | Kawamura et al. .......... 711/162 |
| 2007/0207755 A1 * | 9/2007 | Julia et al. .................... 455/217 |
| 2008/0090654 A1 * | 4/2008 | Okada .......................... 463/29 |
| 2008/0140937 A1 * | 6/2008 | Nalawade et al. ........... 711/119 |
| 2008/0201576 A1 * | 8/2008 | Kitagawa et al. ............. 713/168 |
| 2008/0215909 A1 * | 9/2008 | Bretschneider et al. ........ 714/3 |

FOREIGN PATENT DOCUMENTS

| | | |
|---|---|---|
| JP | A-HEISEI 4-264937 | 9/1992 |
| JP | 5-20107 | 1/1993 |
| JP | A-HEISEI-5-88954 | 4/1993 |
| JP | 09-26906 | 1/1997 |
| JP | A-HEISEI 9-244933 | 9/1997 |
| JP | 11-345139 | 12/1999 |
| JP | P2000-57030 A | 2/2000 |
| JP | 2000-341285 | 12/2000 |
| JP | P2003-345523 A | 12/2003 |
| JP | P2005-293315 A | 10/2005 |

* cited by examiner

*Primary Examiner*—Wing F Chan
*Assistant Examiner*—Tesfay Yohannes
(74) *Attorney, Agent, or Firm*—Scully, Scott, Murphy & Presser, P.C.

(57) ABSTRACT

A transaction processing system includes a first server containing a first memory domain and configured to perform a transaction process as a current operation server; and a second sever containing a second memory domain which has a same size as the first memory domain and stores a replica of data stored in the first memory domain. The transaction processing system further includes third and fourth servers activated to have third and fourth memory domains, respectively; and a control server configured to monitor a failure of the first and second servers.

14 Claims, 9 Drawing Sheets

TRANSACTION PROCESSING SYSTEM AND TRANSACTION PROCESSING METHOD

TECHNICAL FIELD

The present invention relates to a transaction processing system and a transaction processing method which realize a high speed operation and high availability.

BACKGROUND ART

According to a transaction process method in related arts, an I/O operation to a disk occurs during read, update and determination of data to/from a database. For this reason, there is no risk of extinguishment of updated data at server failure, while access performance to the disk becomes an upper limit of transaction process performance. Thus, processing performance cannot be improved beyond a certain extent. In addition, it is difficult to reduce a time required for restoration after system down.

In related art, a system is known in which a transaction process is performed on a memory while performing mirroring. However, there are the following problems in such a system. Restoration after server down takes time. Especially, when servers having different functions such as a server for performing data processing and a server for duplicating processed data are provided, it is necessary to store the data in the latter server once and transfer the data to the server for performing data processing and then, carry out a restoring operation, in order to restore the server for performing data processing.

Also, the restoring operation after server down is performed in the units of logical processed data. When the server is failed and 1000 pieces of the logical processed data is stored in the server, the 1000 pieces of data are restored in a restored server sequentially or for every certain piece in parallel according to the related art method. Therefore, processing depending on the 1000 pieces of data is generated, leading to a limit in processing performance.

Also, flexibility of system configuration such as a reduction in the number of servers is lack, since processing performed in a server for performing data processing is substantially symmetric with that performed in a server for duplicating processed data. Since processing performed in the server for performing data processing is also executed in the server for duplicating processed data, there is a limit in realizing a flexible system configuration, in which the server for duplicating processed data is centralized.

In conjunction with the above description, Japanese Laid Open Patent Publication (JP-P2000-57030A) discloses a client server system having database for performing double update as a related art. In this related art, the client server system has at least one client, a gateway for switching a server connected to the client, a main server and a sub-server in a same configuration and a pair of databases which are referred and updated by the main server and the sub-server. The main server and the sub-server each have an on-line application section for performing on-line processing in response to a message from the client, a database system for referring and updating the database, a message queue sending section for temporarily storing a database change message to the database of the present system and sending the message to the database of the other system, a message queue receiving section for receiving the database change message to the database of the other system and temporarily storing the message, and a message queue activating application section for inputting the database change message to the database of the other system from the message queue receiving section and updating the database of the present system via the database system. In normal operation, the main server performs on-line processing by the on-line application section, changes the main database via the main database system as necessary and sends the database change message to the main database to the main message queue sending section. In the sub-server, the sub-message queue receiving section sequentially receives the database change message to the main database from the main message queue sending section, and the sub-message queue activating application section receives input of the database change message to the main database from the sub-message queue accepting section and updates the sub-database via the sub-database system. When a damage of a file is caused in the main server, the client requesting the processing is connected to the sub-server by switching the gateway, and the sub-server performs on-line processing by the sub-on-line application section, changes the sub-database via the sub-database system as necessary and sequentially sends the database change message to the sub-database to the sub-message queue sending section. After the main server restores its function, the main message queue receiving section receives the database change message to the sub-database under processing from the sub-message queue sending section, and the main message queue activating application section inputs the database change message to the sub-database from the main message queue receiving section and updates the main database via the main database system.

Also, Japanese Laid Open Patent Publication (JP-P2003-345523A) discloses a data multiplexing system. In this related art, the data multiplexing system includes a plurality of main storage devices having at least one main storage volume and sub-storage devices which have at least one sub-storage volume, are connected to the plurality of main storage devices, and holds data in the main storage devices and the sub-storage devices in a multiplexed state by transferring sub-data containing the same contents as main data stored in the main storage volume of the main storage devices to the sub-storage devices and storing the data in the sub-storage volume of the sub-storage devices. The sub-storage device has a section for managing an arrival state of the sub-data, a section for writing the received sub-data into the sub-storage volume time-sequentially on the basis of time data added to the main data and the sub-data to represent the time when a host computer connected to the plurality of main storage devices sends the main data to each main storage device, and a section for performing state exclusion processing which excludes the arrival state of the sub-data from the main storage device from a set condition when the arrival state of the sub-data from the main storage device satisfies the set condition.

Also, Japanese Laid Open Patent Publication (JP-P2005-293315A) discloses a data mirror type cluster system. In this related art, the data mirror type cluster system includes one server which operates as a current operation system and at least one server which operates as a standby system and reflects update of data in a current operation database in the standby database. The servers are provided with databases and a shared memory which can be mutually accessed from the servers, respectively, and connected mutually via an interconnection which can transfer a transaction to the servers on the opposite sides. Each of the servers has a current operation memory driver section for writing update of data on the database into a shared memory when the database operates as the current operation system and a standby memory driver section for writing the data transferred to the shared memory via the interconnection when the database operates as the standby system.

Also, Japanese Laid Open Patent Publication (JP-A-Heisei, 4-264937) discloses an on-line database apparatus. The on-line database apparatus has a magnetic disk unit for storing data to be developed in a memory therein, a main storage unit for storing data to be accessed at high speed therein, a memory data developing section for developing data in the memory, an application interface section for accessing the memory data in accordance with an application program, an on-line control section for controlling a terminal transaction, and a memory data saving section for saving data to the magnetic disk unit at the time of the end of on-line system operation.

Also, Japanese Laid Open Patent Publication (JP-A-Heisei, 5-88954) discloses a database updating method. In this related art, the database updating method is used in a database processing system for storing a primary copy of a database in a main storage device of a processor and a backup copy of the database in a disk device. The database processing system has an updated data storage area for storing data on data updated by a transaction in the main storage device therein, a commit list for storing a transaction number which declares a commit therein, and a batch commit processing section for reflecting an update result of the translation to the primary copy in the backup copy. A transaction registers update of data of the primary copy in the update data storage area after acquiring an exclusive lock to data and registers the transaction number of the transaction itself in a commit list at a declaration of the commit. The transaction also completely releases the exclusive lock of data acquired till then. The batch commit processing section discriminates whether the transaction corresponding to the transaction number registered in the commit list can be committed or not based on data registered in the update data storage area. The batch commit processing section collectively transfers update data of a group of transactions, which can be committed, from the primary copy to a backup copy and reports the completion of commitment to the group of transactions.

Also, Japanese Laid Open Patent Publication (JP-A-Heisei, 9-244933) discloses an apparatus for backing up a database. In this related art the database backup apparatus having a main storage section in which all databases reside, and a secondary storage section for holding backup of the databases and log data. The database backup apparatus has a table for holding data in a continuous area of the main storage section in units of records, columns or a combination of the record unit and the column unit on the basis of types of data guaranteed by a recovery process and data which is not guaranteed by the recovery process, the secondary storage section for storing a table control data including position data of a record on the main storage section in a guaranteed data area and a non-guaranteed data area, a database control data including position data of a column on the main storage section in the guaranteed data area and the non-guaranteed data area and only the data guaranteed by the recovery process in the units of a record unit, a column unit or the combination of the record unit and the column unit, and a backup section for backing up only the data guaranteed by the recovery processing in the units of a record unit, a column unit or the combination of the record unit and the column unit.

SUMMARY

An exemplary object of the present invention is to provide a transaction processing system which realizes high-speed data processing by storing data to be processed in a memory for performing a transaction process.

Another exemplary object of the present invention is to provide a transaction processing system which realizes high availability of overall system through management of data to be processed and a scheme for exchange of data between a plurality of servers.

In an exemplary aspect of the present invention, a transaction processing system includes a first server containing a first memory domain and configured to perform a transaction process as a current operation server; and a second sever containing a second memory domain which has a same size as the first memory domain and stores a replica of data stored in the first memory domain. The transaction processing system further includes third and fourth servers activated to have third and fourth memory domains, respectively; and a control server configured to monitor a failure of the first and second servers.

In an exemplary aspect of the present invention, a transaction processing method comprising: setting first and second servers to a current operation server and a save server having first and second logical server names in an operation mode, respectively; reserving first and second memory domains in said first and second serves to record domain control data indicating start addresses of said first and second memory domains in said first and second memory domains, respectively; reserving a first area for a logical data in said first memory domain and a second area for a replica of the logical data in said second memory domain; performing a transaction process to update the logical data with update data; and when completing the transaction process, marking a portion of the update data to which the transaction process has been completed.

BRIEF DESCRIPTION OF THE DRAWINGS

The above and other objects, advantages and features of the present invention will be more apparent from the following description of certain exemplary embodiments taken in conjunction with the attached drawings, in which.

EXEMPLARY EMBODIMENTS

Hereinafter, a transaction processing system according to exemplary embodiments of the present invention will be described in detail with reference to the attached drawings.

Figure 1:
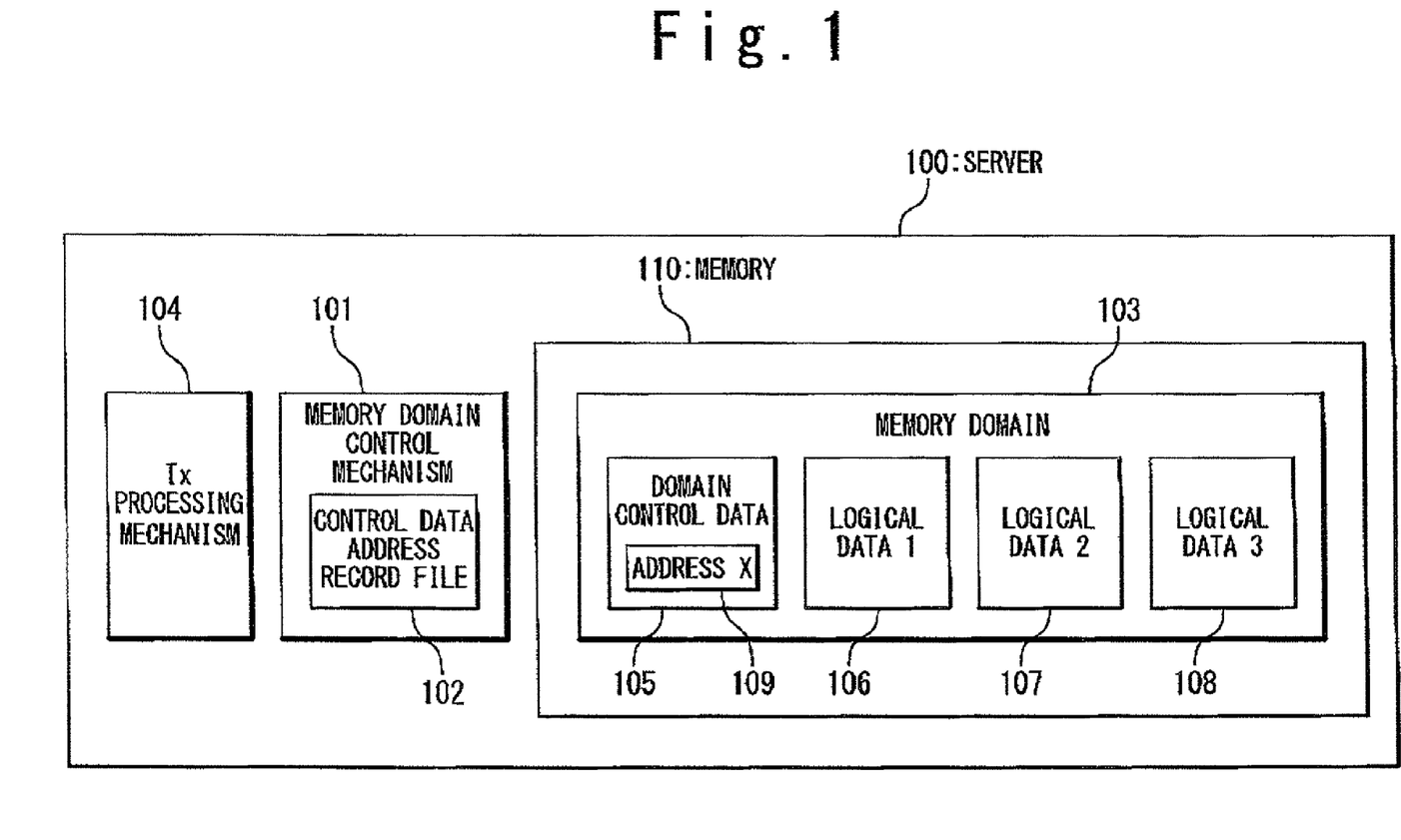
FIG. 1 is a block diagram showing a configuration within a server according to the present invention.

FIG. 1 is a block diagram showing a detailed configuration of a server as each of components in the transaction processing system according to a first exemplary embodiment of the present invention. Referring to FIG. 1, a server 100 includes a memory domain control mechanism 101, a memory 110 and a Tx processing mechanism 104. The memory domain control mechanism 101 includes a control data address record file 102, and the memory 110 has a memory domain 103 including a domain control data 105, logical data 1 106, logical data 2 107, and logical data 3 108. The domain control data 105 has an address X 109.

The memory domain control mechanism 101 manages the memory domain 103 and data in the memory domain 103. The control data address record file 102 records and holds a start address of the domain control data 105 and a shared memory identifier of the memory domain as a shared memory. The memory domain 103 is an area reserved as a shared memory in a memory 110 as a main storage unit of the server. The Tx processing mechanism 104 has a computer program which performs data processing and communicates with other servers to mediate control between the servers. The domain control data 105 has an address X 109 in which a start address of the memory domain 103 is recorded. The logical data 1 106, the logical data 2 107 and the logical data 3 108 are areas reserved in the memory domain 103 and contain data to be processed therein.

The memory domain 103 is reserved in response to a shared memory reserve request to an operating system. Therefore, even when the request to reserve the memory area of the same size is made to the same server as well as a different server, the start address of the memory 110 is not always the same. A unique management name in the system (ID: identification data) is assigned to the memory domain 103 in the system. A part of a file name of the control data address record file 102 may be used for control of the system and contain the name of the memory domain 103 as described in the exemplary embodiments.

In response to the memory reserve request to the memory domain control mechanism 101, the logical data 1 106, the logical data 2 107 and the logical data 3 108 are reserved in the memory domain 103. The memory domain control mechanism 101 records data indicating positions of the logical data 1 106, the logical data 2 107 and the logical data 3 108 in the domain control data 105 according to respective relative addresses from the memory domain start address recorded in the address X 109. The domain control data 105 arranges the memory domains at certain relative address positions from the memory domain start address.

Thus, if the name of the memory domain 103 in the system can be identified, the file name of the control data address record file 102 can be identified. In turn, the start address of the memory domain and the start address of the domain control data 105 can be identified based on the data in the control data address record file 102. Furthermore, by changing the memory domain start address in the address X 109, the memory domain 103 can be located at a different address without changing the other data in the domain control data 105.

Figure 2:
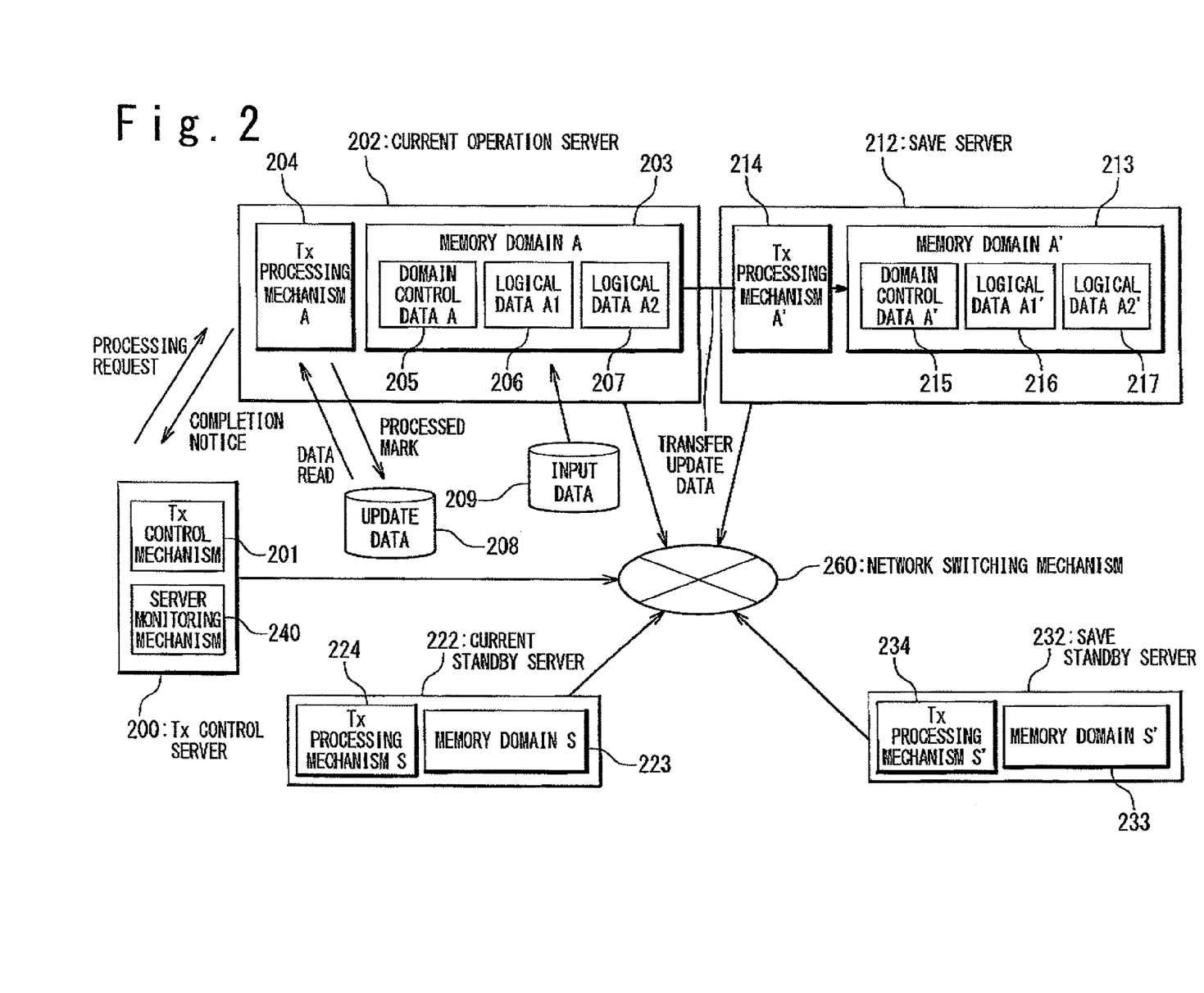
FIG. 2 is a block diagram showing a configuration of a transaction processing system according to a first exemplary embodiment of the present invention.

Next, referring to FIG. 2 as an overall view of the network system according to the present invention, the system includes five kinds of servers. Though being not shown in detail, each server includes the above-mentioned components shown in FIG. 1.

As shown in FIG. 2, the transaction processing system according to the first exemplary embodiment of the present invention has a Tx control server 200, a current operation server 202, a current operation standby server 222, a save server 212, a save standby server 232 and a network switching mechanism 260. The Tx control server 200 has a Tx control mechanism 201 and a server monitoring mechanism 240. The current operation server 202 has a memory domain A 203 and a Tx processing mechanism A 204. The memory domain A 203 has a domain control data A 205, a logical data A1 206 and a logical data A2 207. The current operation server 202 uses update data 208 and input data 209. A save server 212 has a memory domain A' 213 and a Tx processing mechanism A' 214. The memory domain A' 213 has a domain control data A' 215, logical data A1' 216 and logical data A2' 217. The current operation standby server 222 has a memory domain S 223 and a Tx processing mechanism S 224. The save standby server 232 has a memory domain S' 233 and a Tx processing mechanism S' 234.

The update data 208 represents input data for a transaction process. The update data 208 stores data on "what change is applied to which logical data", "what record is added to which logical data" and "which record in which logical data is deleted" therein.

The TX control mechanism 201 of the Tx control server 200 controls the transaction process including an instruction to read data from the update data 208. A logical memory space is reserved as the memory domain A 203 in the memory of the current operation server 202. Data as initial data for processing is read into the memory domain A 203 from the input data 209 by the Tx processing mechanism A 204. The logical data A1 206 and the logical data A2 207 represent areas where the data is read, and the data held therein, and are equivalent to tables in a general database.

The Tx processing mechanism A' 214 of the save server 212 performs a data updating process in response to an instruction from the Tx processing mechanism A 204 so that a replica of the data in the current operation server 202 may be held in the save server 212.

The memory domain A' 213 is a replica of the memory domain A 203. The logical data A1' 216 and the logical data A2' 217 are produced in the memory domain A' 213 as replicas of the logical data A1 206 and the logical data A2 207, respectively.

The current operation standby server 222 serves as an alternative when the current operation server 202 is failed or stops due to an abnormal event, and the save standby server 232 serves as an alternative when the save server 212 is failed. In the current operation standby server 222 and the save standby server 232, a TX processing mechanism S 224 and a Tx processing mechanism S' 234 are activated and the memory domain S 223 and the memory domain S' 233 are reserved in the respective memories. In an initial state, the memory domain S 223 and the memory domain S' 233 do not contain logical data. Although the memory domain A 203, the memory domain A' 213 and the memory domain S 223, memory domain S' 233 each have the areas of a same size, the logical addresses reserved in the respective memories are not always identical.

The servers are connected by a high-speed network through a network switching mechanism 260. Although the connections are not shown, the update data 208 and the input data 209 are connected to the high-speed network in a similar manner so as to be accessed by the servers. Contents of a setting file (not shown) are shared by all the servers. The server monitoring mechanism 240 monitors that the other servers operate normally, through the network connected to the network switching mechanism 260.

Figure 3A:
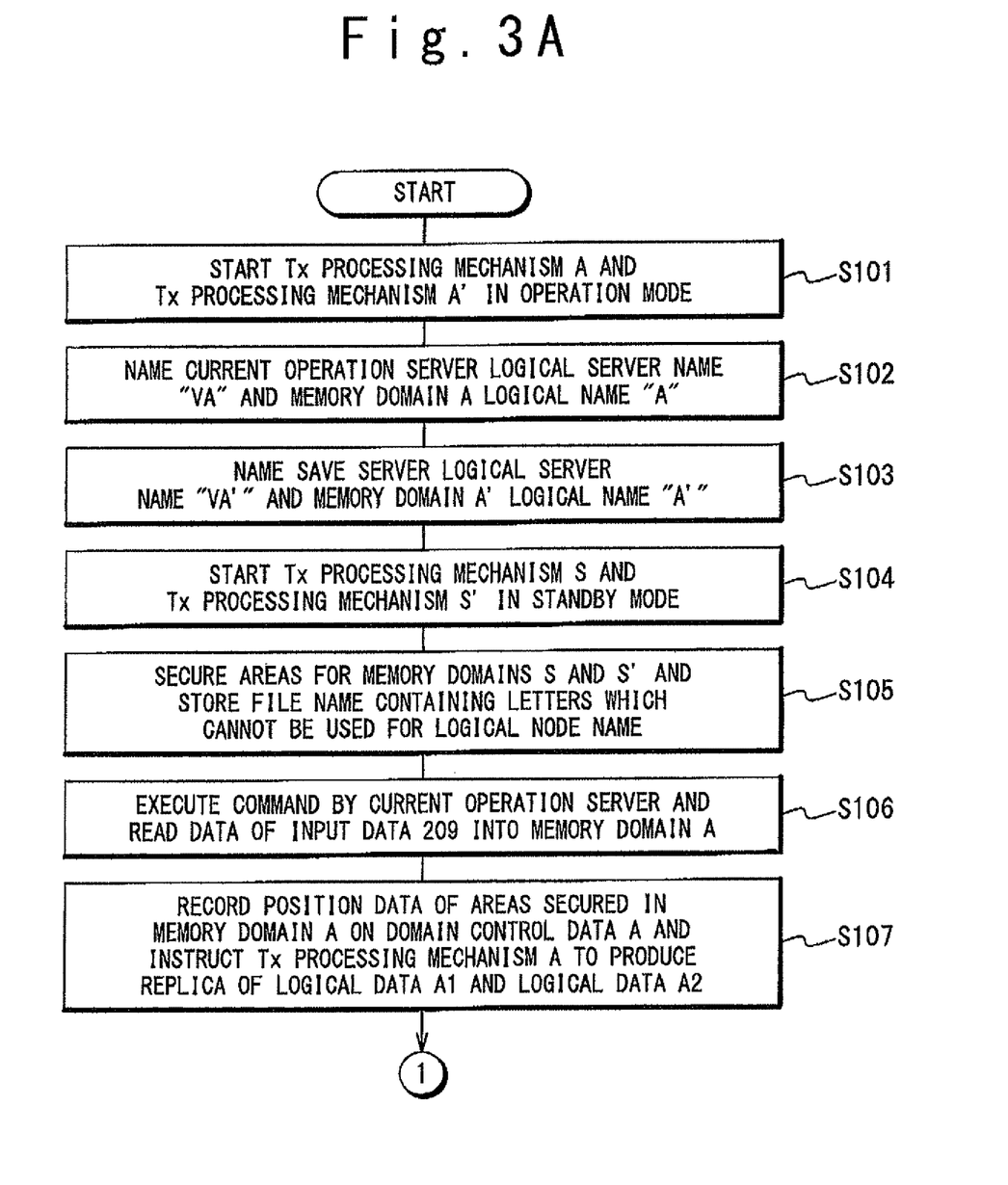
FIGS. 3A and 3B are a flow chart showing an operation of the transaction processing system according to the first exemplary embodiment of the present invention.
Figure 3B:
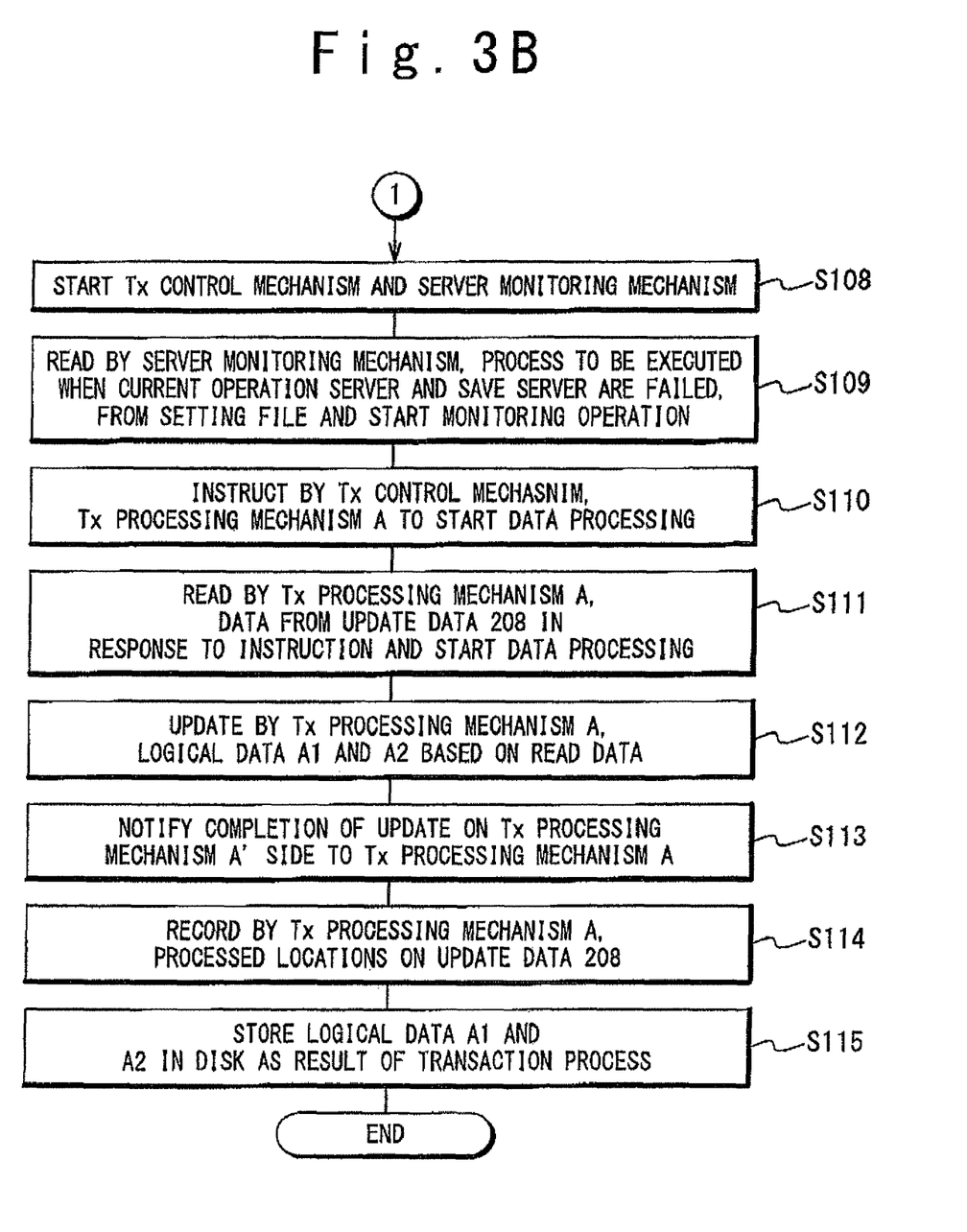

Referring to FIGS. 3A and 3B, an operation for a transaction data process in the transaction processing system according to the first exemplary embodiment of the present invention will be described.

First, the contents of the setting file (not shown) are shared by all the servers.

(1) Step S101

A user starts the Tx processing mechanism A 204 in the current operation server 202 and the Tx processing mechanism A' 214 in the save server 212 in an operation mode. There are two kinds of modes, i.e., the operation mode and a standby mode. In the operation mode, a domain control data is generated in an area reserved as a memory domain.

(2) Step S102

The current operation server 202 is named "VA" as a logical server name. At the same time, the Tx processing mechanism 204 reserves an area (domain) 203 in a memory to name the memory domain 203 as "A". A start address of the memory domain A 203 is stored in a built-in disk (not shown) of the current operation server 202 as an address X in a file having a file name associated with "A". Furthermore, the Tx processing mechanism 204 recognizes from a data of the setting file, that a replica of data in the logical server VA (current operation server 202) should be produced in a logical server VA' (save server 212) and stores it in the Tx processing mechanism A 204 as a replica destination data.

(3) Step S103

Next, the save server 212 is named "VA'" as the logical server name. The Tx processing mechanism 214 recognizes from a data of the setting file that a memory area having a same size as the memory domain 203 is required in the logical server VA'. Thus, the area (domain) 213 in a memory of the save server 212 is reserved and the memory domain 213 is named as "A'". The memory domain name corresponds to the logical server name of the current operation server. The TX processing mechanism 214 stores a start address of the memory domain A' 213 in a built-in disk (not shown) of the save server 212 as an address X in a file having a file name associated with the name of "A'".

(4) Step S104

The Tx processing mechanism S 224 in the current operation standby server 222 and the Tx processing mechanism S' 234 in the save standby server 232 are activated in the standby mode.

(5) Step S105

The memory domain S 223 and the memory domain S' 233 are reserved in the current operation standby server 222 and the save standby server 232 to have the same sizes as the memory domain A 203 and the memory domain A' 2132, respectively. The areas are only reserved and no domain control data is generated. A start address of the reserved memory domain S 223 and a start address of the memory domain S' 233 are stored in built-in disks (not shown) of the current operation standby server 222 and the save standby server 232 as addresses X in files having fixed file names containing a character which cannot be used for a logical server name. For example, provided that "@" cannot be used for the logical server name, the addresses are stored to have the file name "@standby.shm".

(6) Step S106

The Tx processing mechanism 204 of the current operation server 202 reads the input data 209 into the memory domain A 203. When reading the data, the logical data A1 206 and the logical data A2 207 are arranged as areas where the data is stored. It should be noted that the data is read from the input data 209 when there are two tables of the database.

(7) Step S107

The position data of the areas reserved in the memory domain A 203 are recorded in the domain control data A 205 in the form of a relative address, without using the logical address of the memory. At the same time, the Tx processing mechanism A 204 is instructed to produce replicas of the logical data A1 206 and the logical data A2 207 in a replica destination. Thus, data is transferred from the current operation server 202 to the save server 212 via a network so that the logical data A1' 216 and the logical data A2' 217 are generated in the memory domain A'213. The position data of the logical data A1'216 and the logical data A2' 217 are recorded in the domain control data A' 215.

(8) Step S108

Next, the Tx control mechanism 201 and the server monitoring mechanism 240 are started in the Tx control server 200.

(9) Step S109

The server monitoring mechanism 240 reads a process to be performed when the current operation server 202 or the save server 212 are failed, from a data of the setting file and starts a monitoring operation.

(10) Step S110

The Tx control mechanism 201 issues an inquiry to the Tx processing mechanisms of all servers, and finds from responses that the logical server VA is the current operation server 202, and instructs the Tx processing mechanism A 204 of the current operation server 202 to start a data processing operation.

(11) Step S111

In response to the instruction, the Tx processing mechanism A 204 reads data for a transaction process from the update data 208 and starts the data processing operation.

(12) Step S112

The Tx processing mechanism A 204 updates the logical data A1 206 and the logical data A2 207 according to the data read from the update data 208. At this time, the Tx processing mechanism A 204 transfers the updated data (hereinafter, to be referred to as update log) from the current operation server 202 to the save server 212 via the network based on the replica destination data. The Tx processing mechanism A' 214 updates the logical data A1' 216 and the logical data A2' 217 in a similar manner by using the update log. Determination of the updated result is made by the Tx processing mechanism A 204 according to a two-phase commit. A two-phase commit (determination) instruction is transmitted from the current operation server 202 to the save server 212. In this case, while the update on the side of the save server 212 is determined in response to a second phase commit instruction, the Tx processing mechanism A' 214 optimizes the update log in such a manner that a data update quantity of the logical data A1' 216 and the logical data A2' 217 may be made minimum. For example, when the update log to update a data in the logical data A1' 216 in the order of "5", "3" "2" is sent, only the data that the data is finally updated to "2" is held.

(13) Step S113

The fact that the update on the side of the save server has been determined is transmitted from the Tx processing mechanism A' 214 to the Tx processing mechanism A 204 via the network.

(14) Step S114

When the Tx processing mechanism A 204 has completed the processing operation of the data read from the update data 208, the Tx processing mechanism A 204 records a data indicating an already processed data in the update data 208, or marks the data. When all of the transaction operations have completed, the Tx processing mechanism A 204 notifies the completion of the transaction process to the Tx control mechanism 201.

(15) Step S115

The user inputs a command to be executed on the current operation server 202 as necessary, such that the logical data A1 206 and the logical data A2 207 are stored in a disk as transaction process results.

As described above, the process is completed.

Figure 4:
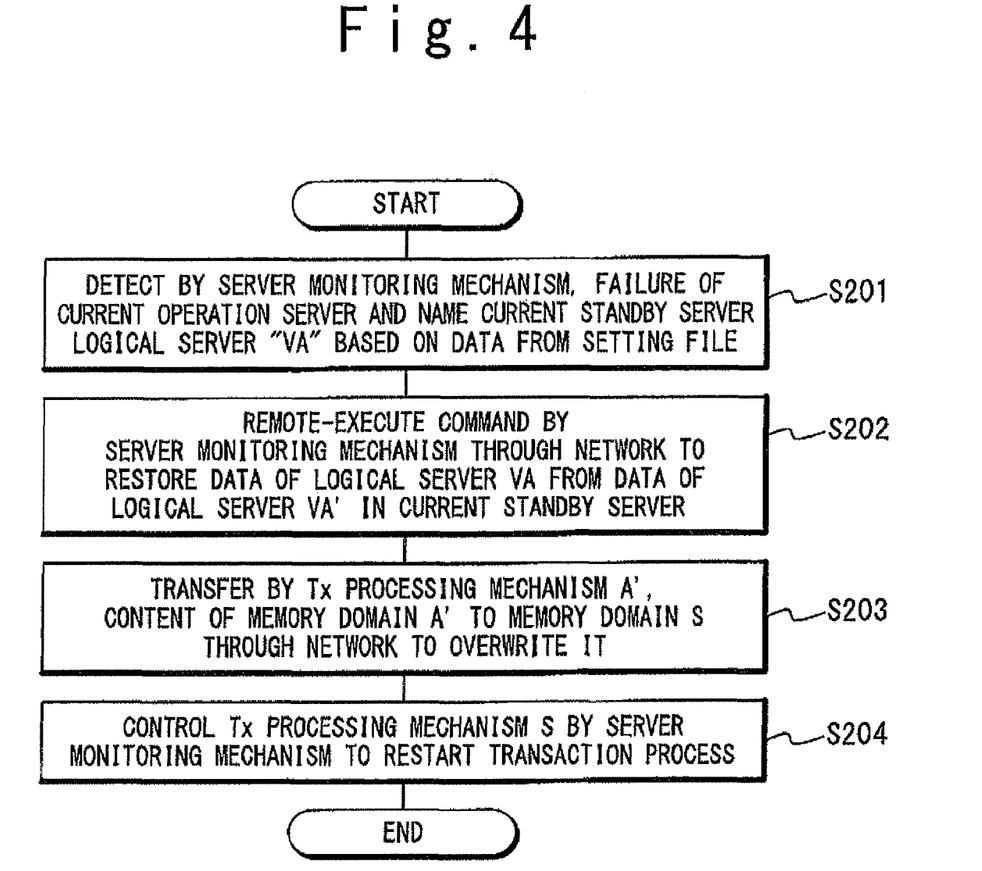
FIG. 4 is a flow chart showing an operation of the transaction processing system according to the first exemplary embodiment of the present invention when a current operation server is failed.

Next, referring to FIG. 4, an operation when the current operation server 202 is failed will be described.

(1) Step S201

When detecting that the current operation server 202 is failed, the server monitoring mechanism 240 starts an operation to name the current operation standby server 222 as the logical server "VA" from the data of the setting file such that the current operation standby server 222 operates in place of the current operation server 202.

(2) Step S202

The server monitoring mechanism 240 executes a command to remotely control the current operation standby server 222 such that the data in the logical server VA is restored from the data in the logical server VA'. By executing the command, inquiries are issued to all the servers and it is found that the logical server VA' is the save server 212. Through execution of the command, the current operation standby server 222 is named as the "logical server VA", and the start address of the memory domain S 223 is read out from the stored file and an area starting from the start address is named as a "new memory domain A". Also, it is informed to the Tx processing mechanism A' 214 that the logical server VA is changed to the current operation standby server 222. In addition, an instruction is issued such that the Tx processing mechanism A' 214 transfers the contents of the memory domain A' 213 to the memory domain S 223 as the "new memory domain A".

(3) Step S203

In response to the above-mentioned instruction, the Tx processing mechanism A' 214 transfer the contents of the memory domain A' 213 to the memory domain S 223 via the network and overwrites on existing contents in the memory domain 223, on completion of the transfer, the server monitoring mechanism 240 controls the Tx processing mechanism 224 to rewrite a logical address stored at a specific position of the domain control data A' 215, i.e., the address X 109 in FIG. 1 into the start address of the memory domain S 223. Thus, data as the logical data A1' 216 and the logical data A2' 217 in the save server 212 can be normally accessed in the current operation standby server 222 (new "logical server VA").

(4) Step S204

The server monitoring mechanism 240 detects that the processing corresponding to the command on the current operation standby server 222 (new "logical server VA") has been completed and controls the Tx processing mechanism S 224 to restart the transaction process.

Figure 5:
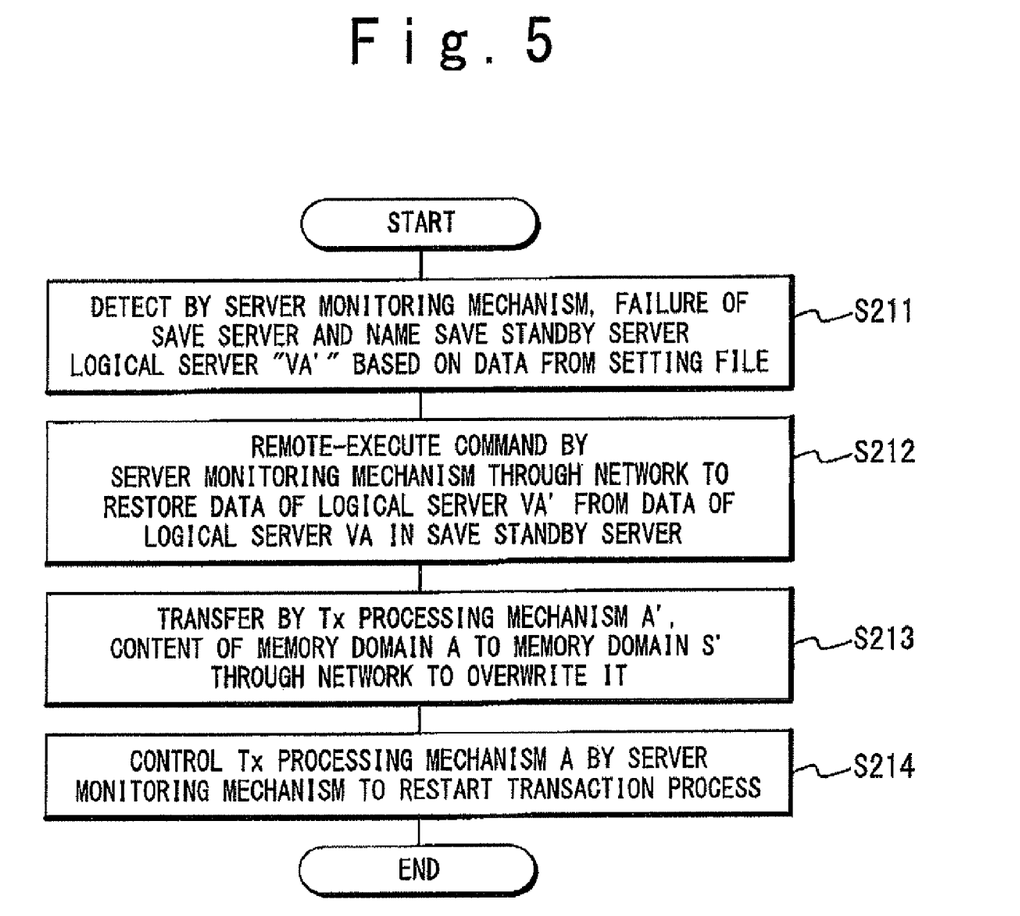
FIG. 5 is a flow chart showing an operation of the transaction processing system according to the first exemplary embodiment of the present invention when a save server is failed.

Next, referring to FIG. 5, an operation when the save server 212 is failed will be described.

(1) Step S211

When detecting that the save server 212 is failed, the server monitoring mechanism 240 starts an operation to name the save standby server 232 as the logical server A' from the data of the setting file and to replace the save server 212 with the save standby server 232.

(2) Step S212

First, the server monitoring mechanism 240 executes a command to remotely control the save standby server 232 to restore a data in the logical server VA' from the data in the logical server VA. Through the execution of the command, inquires are issued to all the servers and it is found that the logical server VA is the current operation server 202. Thus, the save standby server 232 is named as the "logical server VA". Also, the start address of the memory domain S' 233 is read out from the stored file and the Tx processing mechanism S' 234 is controlled to name that the memory domain S' as a "new memory domain A". The server monitoring mechanism 240 notifies to the Tx processing mechanism A 204 that the logical server VA' is changed to the save standby server 232, and instructs the Tx processing mechanism A 204 to transfer contents of the memory domain A 203 to the memory domain S' 233 as the new memory domain A'.

(3) Step S213

The Tx processing mechanism A 201 transfers the contents of the memory domain A 203 to the memory domain S 233' via the network in response to the above-mentioned instruction. On completion of the transfer, the server monitoring mechanism 240 controls the Tx processing mechanism S' 234 to rewrite the logical address stored at a specific position (an address X 119 in FIG. 1) of the domain control data A 205 into the start address of the memory domain S1 233.

Thus, the logical data A1' 216 and the logical data A2' 217 in the save server 212 can be normally copied to produce a replica in the save standby server 232 (new logical server VA').

(4) Step S214

The server monitoring mechanism 240 detects that the process corresponding to the command has been completed in the save standby server 232 (new logical server VA') and instructs the Tx processing mechanism A 204 to restart the transaction process.

Figure 6:
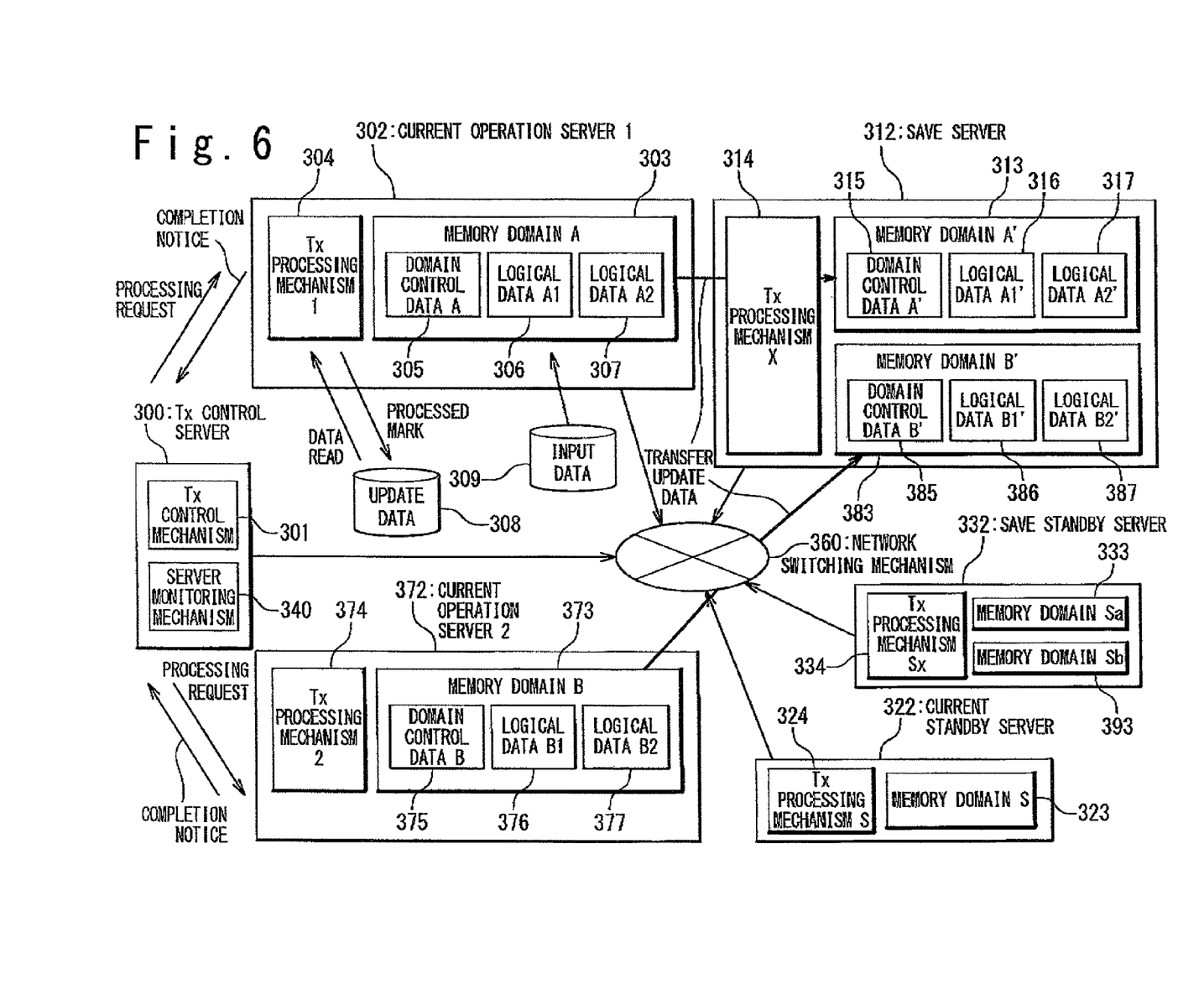
FIG. 6 is a block diagram showing a configuration of the transaction processing system according to a second exemplary embodiment of the present invention.

Next, referring to FIG. 6, the transaction processing system according to the second exemplary embodiment of the present invention will be described in detail. As shown in FIG. 6, the transaction processing system in the second exemplary embodiment includes a Tx control server 300, a current operation server 1 302, a current operation server 2 372, a current operation standby server 322, a save server 312, a save standby server 332, and a network switching mechanism 360. The Tx control server 300 includes a Tx control mechanism 301 and a server monitoring mechanism 340. The current operation server 302 includes a memory domain A 303 and a Tx processing mechanism A 304. The memory domain A 303 includes a domain control data A 305, a logical data A1 306 and a logical data A2 307. The current operation server 302 uses update data 308 and input data 309, A save server 312 includes a memory domain A' 313, a Tx processing mechanism A' 314 and a memory domain B' 383. The memory domain A' 313 includes a domain control data A' 315, a logical data A1' 316 and a logical data A2' 317. A memory domain B' 383 includes a domain control data B' 385, a logical data B1' 386 and a logical data B2' 387. The current operation standby server 322 includes a memory domain 323 and a Tx processing mechanism S 324. The save standby server 332 includes a memory domain Sa 333, a memory domain Sb 393, and a Tx processing mechanism Sa 334. A current operation server 2 372 includes a memory domain B 373 and a Tx processing mechanism 2 374. The memory domain B 373 includes a domain control data B 375, a logical data B1 376 and a logical data B2 377.

Compared with FIG. 2, the configuration shown in FIG. 6 includes the following additional components: the current operation server 2 372 including the memory domain B 373, the Tx processing mechanism 2 374, the domain control data B 375, the logical data B1 376 and the logical data B2, and the memory domain B' 383 including the domain control data B' 385, the logical data B1' 386 and the logical data B2' 387 in the save server 312. In correspondence to the save server 312, there is the save standby server 332 including the Tx processing mechanism Sx 334, the memory domain Sa 333 and the memory domain Sb 393.

Although paths are not shown, as in FIG. 2, contents of the setting file (not shown), the update data 308 and the input data 309 are shared by all the servers.

Next, referring to FIG. 7, an operation of the transaction data processing in accordance with the second exemplary embodiment of the present invention will be described in detail.

(1) Step S301

The user starts the Tx processing mechanism A 304 in the current operation server 1 302, the TX processing mechanism X 314 in the save server 312 and the Tx processing mechanism 2 374 in the current operation server 2 372 in the operation mode.

(2) Step S302

Next, the user makes the save server 312 to execute a command to name the logical server as "Vx". The save server 312 recognizes from data of the setting file that memory areas having the same size as the memory domain A 303 and the memory domain B 373 are required in the logical server Vx, and reserves the areas in the memory of the save server 312 and names the areas as the memory domain A' 313 and the memory domain B' 383. Start addresses of the memory domain A' 313 and the memory domain B' 383 are stored in a built-in disk (not shown) of the save server 312 as the addresses X in files having file names associated with the names of "A'" and "B'".

(3) Step S303

The current operation server 1 302 executes a command to name the logical server as "VA". At the same time, the current operation server 1 302 reserves an area in the memory 303 to name the area as the memory domain A. A start address of the memory domain A 303 is stored in a built-in disk (not shown) of the current operation server 302 as the address X in a file having a file name associated with the "A". Furthermore, the current operation server 1 302 recognizes from data of the setting file that a replica of the logical server VA (current operation server 1 302) should be produced in the logical server VA' (save server 312), and stores it in the Tx processing mechanism 1 304 as the replica destination data.

(4) Step S304

The current operation server 2 372 executes a command to name the logical server as "VB". At the same time, the current operation server 2 372 reserves an area in the memory 373 to name the area as the memory domain B 373. A start address of the memory domain B 373 is stored in a built-in disk (not shown) of the current operation server 372 as the address X in a file having a file name associated with the "B". Furthermore, the current operation server 2 372 recognizes from the data of the setting file 350 that a replica of the logical server VB (current operation server 2 372) should be produced in the logical server Vx (save server 312) and stores it in the Tx processing mechanism 2 374 as the replica destination data.

(5) Step S305

When the Tx processing mechanism S 324 in the current operation standby server 322 is activated in the standby mode, the memory domain S 323 having the same size as the larger one of the memory domain A 303 and the memory domain B 373 is reserved based on data of the setting file. The area is only reserved and no domain control data is generated. A start address of the reserved memory domain S 323 is stored in built-in disk (not shown) of the current operation standby server 322 as the address X in a file having a file name which contains a character which cannot be used in a logical server name and follows a certain rule. For example, provided that "@" cannot be used in the logical server name, the address is stored to have the file name "@standby.shm".

(6) Step S306

When the Tx processing mechanism Sx 334 in the save standby server 332 is activated in the standby mode, the memory domain Sa 333 having the same size as the memory domain A' 313 and the memory domain Sb 393 having the same size as the memory domain B' 383 are reserved based on the data of the setting file. The areas are only reserved and no domain control data are generated. Start addresses of the reserved memory domain Sa 333 and the memory domain Sb 393 are stored in the built-in disk (not shown) of the save standby server 332 the addresses X in files having file names which contain a character which cannot be used in a logical server name and follows a certain rule. Provided that "@" cannot be used in the logical server name, the addresses are stored to have the file names "@standby_A.shm" and "@standby_B.shm", respectively.

(7) Step S307

Subsequently, as in the example shown in FIG. 2, a command is executed in the current operation server 1 302 and the current operation server 2 372 and data is read from the input data 309. After that, in the Tx control server 300, the Tx control mechanism 301 and the server monitoring mechanism 340 are activated.

(8) Step S308

Update logs as results that data has been updated in the current operation server 1 302 and the current operation server 2 372 are sent to the Tx processing mechanism X 314 in the save server 312. The Tx processing mechanism X 314 recognizes that the memory domain A' 313 and the memory domain B' 383 correspond to the memory domain A 303 and the memory domain B 373, respectively, from data of the setting file, classifies the sent update logs into the memory domain A' 313 and the memory domain B' 383, and performs update processes of the logical data A1' 316, the logical data A2' 317, the logical data B1' 386 and the logical data B2' 387.

Figure 7:
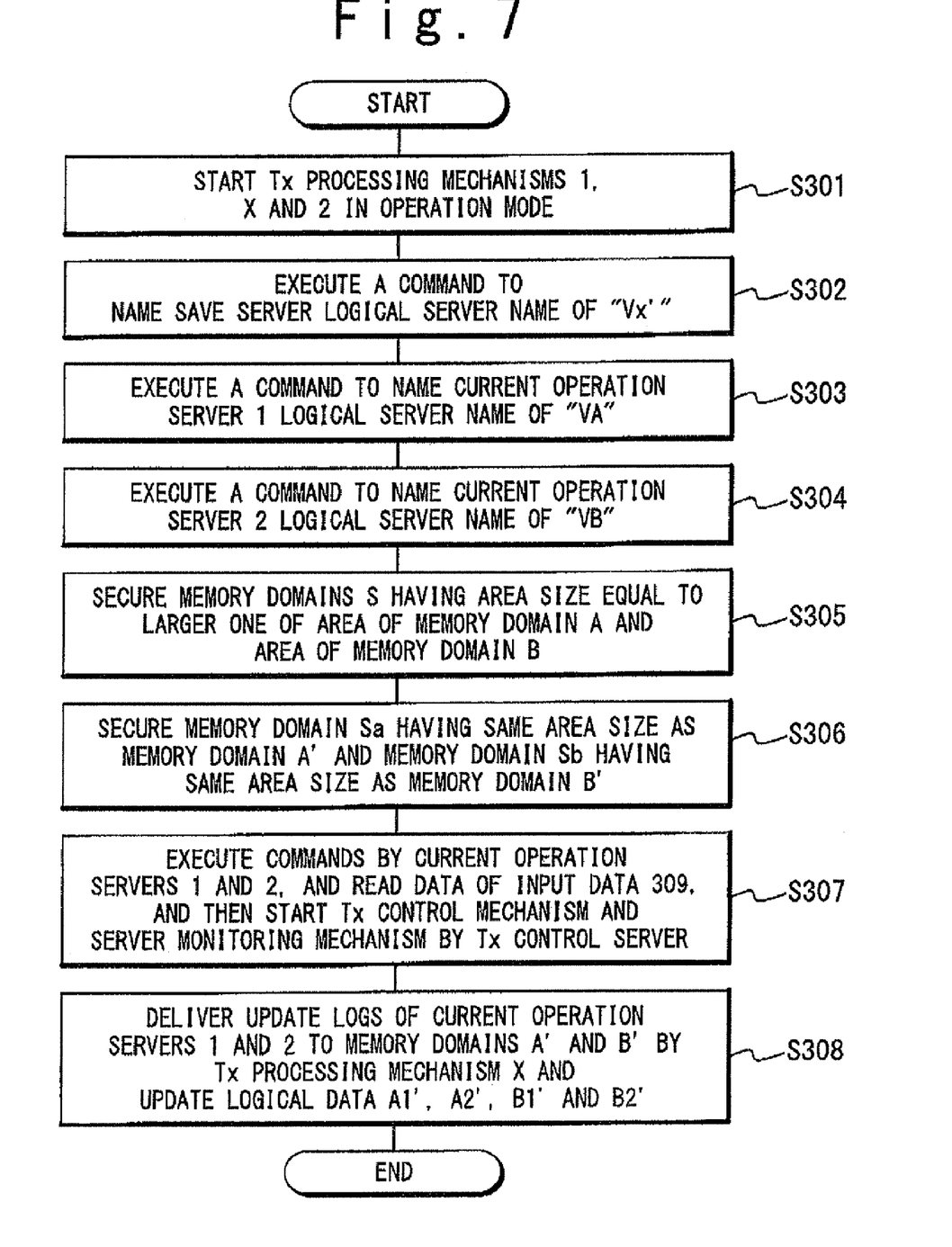
FIG. 7 is a flow chart showing an operation of the transaction processing system according to the second exemplary embodiment of the present invention.

An operation when the current operation server 1 302 or the current operation server 2 372 is failed in FIG. 7 is substantially the same as the operation of the system shown in FIG. 2. However, since the size of the memory domain S 323 does not necessarily correspond to the size of the domain from which data is transferred, the size of an effective (available) area is recorded in the domain control data after memory domain data from the save server 312 is transferred.

Figure 8:
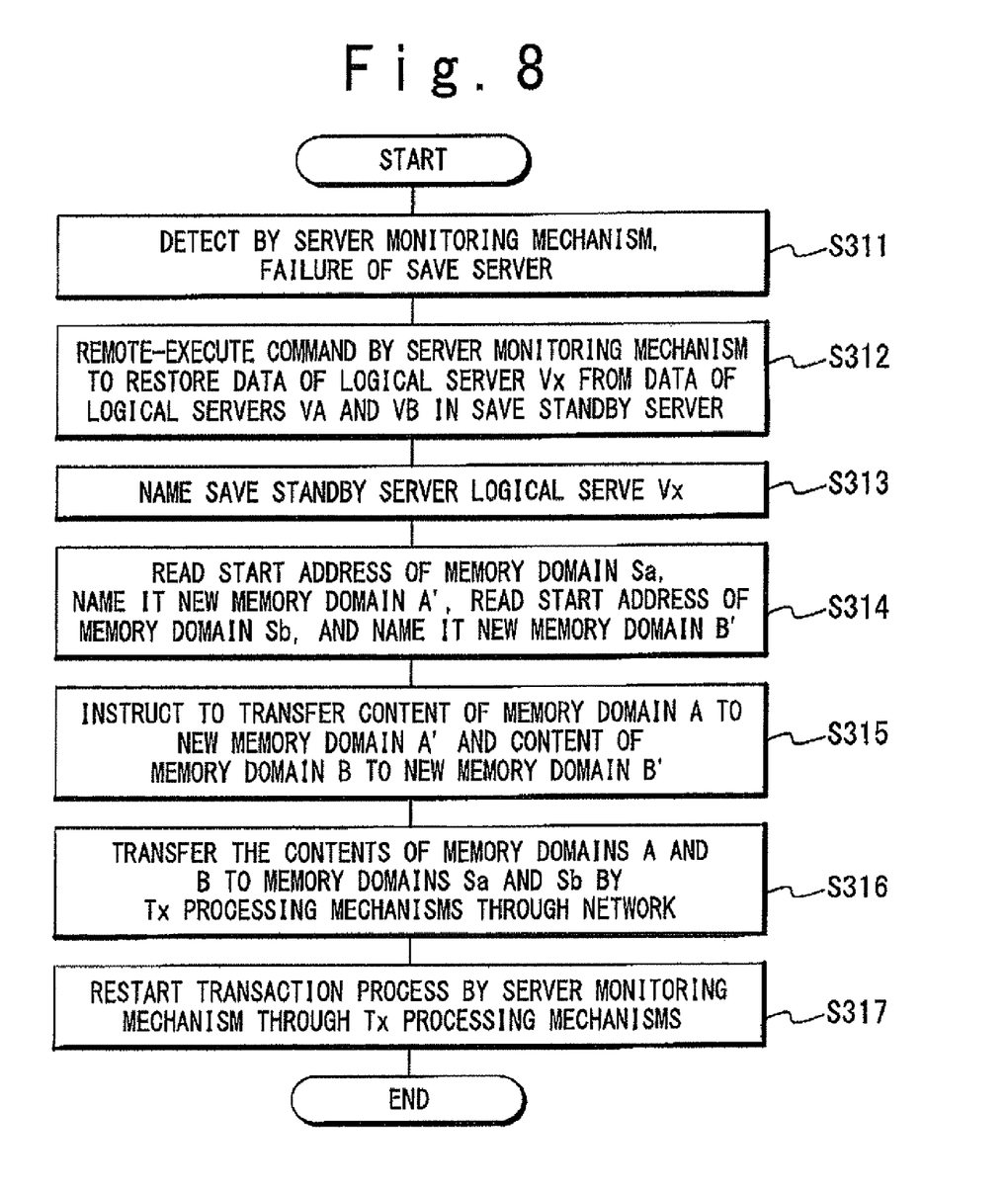
FIG. 8 is a flow chart showing an operation of the transaction processing system according to the second exemplary embodiment of the present invention when a save server is failed.

Next, referring to FIG. 8, an operation when the save server 312 is failed will be described.

(1) Step S311

When detecting that the save server 312 is failed, the server monitoring mechanism 340 names the save standby server 332 as the logical server "Vx" based on the held data of the setting file, and starts an operation for replacing the save server 312 with the save standby server 332.

(2) Step S312

The server monitoring mechanism 340 remotely executes a command to control the save standby server 232 to restore a data in the logical server "Vx" from the data in the logical server "VA" and the logical server "VB".

(3) Step S313

In response to the execution of the command, inquires are issued to all the servers and it is found that the logical server VA is the current operation server 1 302 and the logical server VB is the current operation server 2 372. In this way, the save standby server 332 is named as the logical server "Vx".

(4) Step S314

Furthermore, it is recognized from the data of the setting file that the memory domain Sa 333 is an area as an alternative for the memory domain A' 313, i.e., an area for the replica of the memory domain A 303, and identifies a file which stores the start address therein according to the predetermined file naming rule (in the above-mentioned example, "@standby_A.shm"). Thus, the start address of the memory domain Sa 333 is read and it is named as a "new memory domain A" through the Tx processing mechanism "Sx" 334. Similarly, the start address of the memory domain Sb 393 is specified and it is named as a "new memory domain "B'".

(5) Step S315

The server monitoring mechanism 340 informs to the Tx processing mechanism 1 304 and the Tx processing mechanism 2 374, that the logical server Vx is changed to the save standby server 332, and instructs the Tx processing mechanism 1 304 to transfer contents of the memory domain A 303 to the memory domain Sa 333 as the new memory domain A' and the Tx processing mechanism 2 374 to transfer contents of the memory domain B 373 to the memory domain Sb 393 as the new memory domain B'.

(6) Step S316

The Tx processing mechanism 1 304 and the Tx processing mechanism 2 374 transfer the contents of the memory domain A 303 and the contents of the memory domain B 373 to the memory domain Sa 333 and the memory domain Sb 393 via the network in response to the above-mentioned instruction, respectively. On completion of the transfer, the logical address stored at a specific position of the domain control data A 305 (the address X 109 in FIG. 1) is rewritten into the start address of the memory domain Sa 333, and the logical address stored at a specific position of the domain control data B 375 is rewritten into the start address of the memory domain Sb 393. Thus, the logical data A1 306 and the logical data A2 307 in the current operation server 1 302 and the logical data B1 376 and the logical data B2 377 in the current operation server 2 372 are normally copied in the save standby server 332 (new logical server "Vx").

(7) Step S317

The server monitoring mechanism 340 knows the completion of execution of the command by the save standby server 332 (new logical server "Vx"), and controls the Tx processing mechanism 1 304 and the Tx processing mechanism 2 374 to restart a transaction process.

As described above, in the present invention, high-speed data processing is realized in a computer system for performing a so-called transaction process by locating data to be processed in a memory as well as high availability of the overall system is realized through management of data to be processed and a scheme for exchange of data between a plurality of servers.

According to the present invention, all of data to be processed are located in the memory once and a data update process is performed in the memory. The updated data are stored in the disk when the process has been completed or the process of the data of a certain block has been completed. Thus, high-speed transaction process can be realized. Furthermore, since a replica of the data is held at all times in a server other than the server for performing a data process, a data loss on a failure of the server is prevented. In addition, by restoring the data directly in the memory without passing through the disk at the restoration, the process can be rapidly restarted.

In the present invention, a transaction data can be processed at a high speed. This is because all data to be processed is located in a memory, updated in the memory, and stored in a disk in a batch after completion of a transaction process. By using such an operation, access to the disk does not stand in way of an increase in processing speed. Also, there is little possibility that data under processing disappears. This is because the plurality of servers hold a replica of the data under processing in the memory. Moreover, processing can be rapidly restarted after server is failed. This is because the data in the server which has been failed is restored in a memory of the standby server in an exploded format.

Also, data can be rapidly restored in the standby server after server is failed. This is because the number of times of data transfer to the standby server is suppressed by locating logical data in an area reserved temporarily in the memory rather than locating the logical data in an area reserved directly in the memory. Thus, the number of times of address conversion in the standby server is handled to which the data is transferred. Furthermore, when the reserved shared memory is large, mapping of logical address-physical address takes time at the first memory access. However, according to the present invention, since the data is transferred to the previously reserved and mapped area, the above-mentioned time can be suppressed.

In addition, a CPU load at a peak period on a side of the save server is smaller than that on the side of the current operation server. This is because through adoption of a two-phase commit method for data processing optimization of data updated till the second commit on the side of the save server, thereby reducing throughput (data update quantity) at the second commit on the side of the save server.

Although the PRESENT invention has been described above in connection with several embodiments thereof, it will be apparent to those skilled in the art that those embodiments are provided solely for illustrating the invention, and should not be relied upon to construe the appended claims in a limiting sense.

What is claimed is:

1. A transaction processing system comprising;

a first server comprising a first memory domain and configured to perform a transaction process as a current operation server;

a second sever comprising a second memory domain which has a same size as said first memory domain and stores a replica of data stored in said first memory domain;

third and fourth servers activated to have third and fourth memory domains, respectively; and a control server configured to monitor a failure of said first and second servers, wherein each of said first to fourth servers comprises:

a processing mechanism configured to perform said transaction process and a control between said, servers;

said memory domain comprising:
  a logical data, and
  a domain control data which holds a start address of said memory domain; and a memory domain control mechanism configured to reserve an area for said logical data in said memory domain in response to a memory reserve request from said processing mechanism, to record a position of said logical data as a relative address from said start address in said domain control data, and to locate said domain control data at a predetermined position from said start address of said memory domain, wherein said memory domains of said first to fourth servers are said first to fourth memory domains, respectively, and wherein said memory domain control mechanism of said first server records the position of said logical data in said domain control data as relative position from said start address of said memory domain.

2. The transaction processing system according to claim 1, wherein said memory domain of each of said first and second servers is shared by said first to fourth servers.

3. The transaction processing system according to claim 1, wherein said memory domain control mechanisms of said third and fourth servers hold said start addresses of said third and fourth memory domains as fixed file names which contain a letter which cannot be used for a logic server name.

4. The transaction processing system according to claim 1, wherein said control server comprises:
  a server monitoring mechanism configured to monitor through a network that each of said servers on said network is operating normally; and
  a control mechanism configured to instruct said current operation server to perform said transaction process by using said update data,
  wherein said server monitoring mechanism reads a process to be executed when said current operation server or said save server is failed from a setting file and starts a monitoring operation of said servers, and
  said control mechanism confirms said current operation server and said save server and instructs said processing mechanism of said current operation server to start said transaction process.

5. A transaction processing method comprising:
  setting first and second servers to a current operation server and a save server having first and second logical server names in an operation mode, respectively;
  reserving first and second memory domains in said first and second servers to record domain control data indicating start addresses of said first and second memory domains in said first and second memory domains, respectively;
  reserving a first area for a logical data in said first memory domain and a second area for a replica of the logical data in said second memory domain;
  performing a transaction process to update the logical data with update data; and
  when completing the transaction process, marking a portion of the update data to which the transaction process has been completed,
  wherein said reserving a first area and a second area comprises:
    reserving the first area in said first memory domain;
    reserving a second area in said second memory domain;
    recording a position data of the first area in said domain control data of said first memory domain in a form of relative position from a start position of said first memory domain; and
    recording a position data of the second area in said domain control data of said second memory domain as relative position from a start position of said second memory domain.

6. The transaction processing method according to claim 5, wherein said setting first and second servers comprises:
  starting a processing mechanism of said current operation server in the operation mode;
  starting a processing mechanism of said save server in the operation mode,
  giving said current operation server said first logic server name of "VA"; and
  giving said save server said second logic server name of "VA".

7. The transaction processing method according to claim 5, wherein said reserving first and second memory domains
  reserving an area on a memory of said current operation server to name as said first memory domain of "A";
  reserving an area on a memory of said save server to name as said second memory domain "A";
  generating said domain control data for said first memory domain, and said domain control data for said second memory domain; and
  recording said domain control data in said first and second memory domains, respectively.

8. The transaction processing method according to claim 5, wherein said performing a transaction process comprises:
  updating the logical data based on the update data;
  transferring the updated logical data from said current operation server to said save server based on a replica production destination data;
  updating the replica of the logical data based on the transferred updated logical data; and
  notifying determination of the update of the replica of the logical data to said current operation server.

9. The transaction processing method according to claim 5, further comprising:
  starting third and fourth servers as a current operation standby server and a save standby server in a standby mode;
  reserving third and fourth memory domains in said third and fourth servers to record domain control data indicating start addresses of said third and fourth memory domains in said third and fourth memory domains to have fixed file names which contain a letter which cannot be used for a logic domain name, for inactivating said third and fourth memory domains, respectively.

10. The transaction processing method according to claim 9, further comprising:
  monitoring a failure of said current operation server;
  when detecting that said current operation server is failed, setting said current operation standby server to a new current operation server;
  activating said third memory domain;
  reserving a third area for a logical data in said third memory domain;

transferring the replica of the logical data from said save server to said new current operation server;
restoring the logical data from the replica to store in the third area.

11. The transaction processing method according to claim 9, further comprising:
monitoring a failure of said save server;
when detecting that said save server is failed, setting said save standby server to a new save server;
activating said fourth memory domain;
reserving a fourth area for a logical data in said fourth memory domain;
transferring the logical data from said current operation server to said new save server;
restoring the replica of the logical data from the transferred logical data to store in the fourth area.

12. The transaction processing method according to claim 5, wherein said setting further comprises:
setting a fifth server to another current operation server having a fifth logical server name in the operation mode, said reserving first and second memory domains comprises:
reserving a fifth memory domain in said fifth serve to record a domain control data indicating a start address of said fifth memory domain in said fifth memory domain,
reserving a fifth area for another logical data in said fifth memory domain,
said transaction processing method further comprises:
updating said another logical data based on the update data;
transferring said updated logical data from said fifth server to said save server based on another replica production destination data;
updating the replica of the logical data based on the transferred updated logical data from said fifth server; and
notifying determination of the update of the replica of the logical data to said fifth server; and
when completing the transaction process, marking a portion of the update data to which the transaction process has been completed.

13. The transaction processing method according to claim 12, further comprising:
monitoring a failure of said first or fifth server;
when detecting that said first or fifth server is failed, setting said current operation standby server to a new current operation server;
activating said third or fifth memory domain;
reserving a third area for a logical data in said third or fifth activated memory domain;
transferring the replica of the logical data from said save server to said new current operation server;
restoring the logical data from the replica to store in the third area.

14. The transaction processing method according to claim 12, further comprising:
monitoring a failure of said save server;
when detecting that said save server is failed, setting said save standby server to a new save server;
activating said fourth memory domain based on a size of said first or fifth memory domain;
reserving a fourth area for a logical data in said fourth memory domain;
transferring the logical data from said first or fifth server to said new save server;
restoring the replica of the logical data from the transferred logical data to store in the fourth area.

* * * * *